(12) United States Patent
Patra et al.

(10) Patent No.: US 11,169,341 B2
(45) Date of Patent: Nov. 9, 2021

(54) SYSTEM AND METHOD FOR ALL OPTICAL ELECTRODE INTERFACE FOR BIOENGINEERING APPLICATION

(71) Applicant: Lawrence Livermore National Security, LLC, Livermore, CA (US)

(72) Inventors: Susant Patra, Brentwood, CA (US); Razi-Ul Muhammad Haque, San Francisco, CA (US); Komal Kampasi, San Francisco, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 16/591,792

(22) Filed: Oct. 3, 2019

(65) Prior Publication Data

US 2021/0103110 A1 Apr. 8, 2021

(51) Int. Cl.
| | |
|---|---|
| *G02B 6/43* | (2006.01) |
| *G02B 6/42* | (2006.01) |
| *G02B 6/12* | (2006.01) |
| *H04B 10/40* | (2013.01) |

(52) U.S. Cl.
CPC ............... *G02B 6/43* (2013.01); *G02B 6/12* (2013.01); *G02B 6/4292* (2013.01); *G02B 2006/1215* (2013.01); *H04B 10/40* (2013.01)

(58) Field of Classification Search
None
See application file for complete search history.

(56) References Cited

U.S. PATENT DOCUMENTS

| | | | |
|---|---|---|---|
| 2007/0297708 A1* | 12/2007 | Peyghambarian | G02F 1/065 385/2 |
| 2009/0074421 A1* | 3/2009 | Thaniyavarn | H04B 10/25758 398/116 |
| 2010/0098424 A1* | 4/2010 | Ho | G02F 1/2255 398/116 |
| 2012/0328298 A1* | 12/2012 | Yl | H01Q 3/2676 398/96 |
| 2013/0004137 A1* | 1/2013 | Jin | C08G 77/24 385/144 |
| 2014/0270618 A1* | 9/2014 | Dinu | H01S 5/14 385/3 |
| 2019/0265541 A1* | 8/2019 | Nakamura | G02F 1/1345 |
| 2019/0319356 A1* | 10/2019 | Shi | H01Q 21/22 |

* cited by examiner

*Primary Examiner* — Tina M Wong
(74) *Attorney, Agent, or Firm* — Harness, Dickey & Pierce, P.L.C.

(57) ABSTRACT

The present disclosure relates to an electro-optical modulator system having a source laser which generates an input optical signal. The input optical signal is received by an electro-optical module. The electro-optical module is implantable into an anatomy and includes a plurality of pixels. Each pixel has associated therewith an electrode and an optical modulator subsystem. The electrode receives electrical signals from the anatomy. The optical modulator subsystem receives the input optical signal and modulates the input optical signal to generate modulated optical output signals in relation to the received electrical signals. A detector subsystem may be used to receive and collect the modulated optical output signals.

20 Claims, 6 Drawing Sheets

FIGURE 1

FIGURE 2    Initial Applied Voltage to the Modulator: $V_\pi - \Delta V_e$

SYSTEM AND METHOD FOR ALL OPTICAL ELECTRODE INTERFACE FOR BIOENGINEERING APPLICATION

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to electrical interfaces especially well suited for bioengineering applications, and more particularly to an all optical electrode interface for high density neural implant applications which enables interfacing to a large plurality of electrodes, while eliminating the need for a large number of electrical conductors and corresponding electrical connections.

BACKGROUND

The statements in this section merely provide background information related to the present disclosure and may not constitute prior art.

Bioengineering applications, and particularly those involving neural implants, can involve collecting neural responses from dozens, hundreds or even thousands or more individual electrodes, or applying electrical or optical signals to the human body, and particularly the brain, via a corresponding large number of electrodes.

As the need for recording electrical activity in bioengineering applications has increased in recent years, so too has the number of electrodes needed to accomplish the necessary recording. The issue becomes especially acute when tens of thousands of electrodes are needed to collect and transmit information to some subsystem for recording. Under this circumstance, the traditional approach of using individual electrical conductors to make contact with separate electrodes, and separate electrical conductors to route signals from each electrode, becomes extremely unwieldly and impractical. Such existing systems are based on an electrical processing interface which is connected to each one of the electrodes. These electrical interfaces also typically include amplifiers separately associated with each electrode. The amplifiers need to be housed in a hermetically sealed package located close to the electrode to minimize the distance between the electrodes and the processing units. This limitation further constrains the number of electrical conductor wires due to the complexity of handling the system.

Accordingly, there is a strong need in the bioengineering field, and especially in connection with neural monitoring and stimulation applications, for systems and methods which enable interfacing to extremely large pluralities of electrodes (e.g., thousands or more), more efficiently and with more compact subassemblies that minimize or eliminate the need for point to point wiring connections and independent wires.

SUMMARY

This section provides a general summary of the disclosure, and is not a comprehensive disclosure of its full scope or all of its features.

In one aspect the present disclosure relates to an electro-optical modulator system. The system may comprise an optical source for generating an input optical signal, and an electro-optical module implantable into an anatomy. The electro-optical module includes a plurality of pixels. Each pixel may have associated therewith an electrode and an optical modulator subsystem. The electrode receives electrical signals from the anatomy. The optical modulator subsystem is disposed in proximity to the electrode and receives the input optical signal and modulates the input optical signal in relation to the received electrical signals. This produces modulated optical output signals which are modulated in relation to the received electrical signals. The system also includes a detector subsystem for detecting the modulated optical output signals.

In another aspect the present disclosure relates to an electro-optical modulator system. The system may comprise a laser for generating an optical signal and an input optical fiber for receiving the optical signal. An electro-optical module may be included which is in communication with the input optical fiber and which is implantable into an anatomy. The electro-optical module may include a substrate having first and second sides. The first side of the substrate side may include a ground plane and a plurality of pixels, and the second side of the substrate may include a plurality of electrodes. An optical splitter may be included which is supported on the substrate for splitting the optical signal into a plurality of input optical signal components. Each pixel may have associated therewith an associated one of the electrodes for receiving electrical signals originating from an anatomy, and detected by the associated one of the electrodes. Each pixel may also include an optical modulator subsystem supported on the first side of the substrate and disposed in proximity to the electrode, for receiving the optical signal and modulating the optical signal in relation to the received electrical signals, and generating modulated optical output signals in relation to the received electrical signals. Still further, an optical combiner may be included which forms a network of output waveguide elements and which is supported on the substrate. The optical combiner is configured to receive the modulated optical output signals from each one of the pixels and combine the received, modulated optical output signals into a single output waveguide element.

In still another aspect the present disclosure relates to a method for monitoring electrical signals originating within an anatomy. The method may include using an optical source to supply an input optical signal over an input fiber optic element. The method may further include using an electro-optical module implanted within the anatomy, and in communication with the input fiber optic element, to receive the input optical signal. The method may further include using the electro-optical module to receive electrical signals generated from within the anatomy, and using the electro-optical module to convert the received electrical signals into modulated optical signals. The method may further include using the electro-optical module to combine and supply the modulated optical signals into a single output fiber optic element. The method may also include using a detector subsystem to receive the modulated optical signals from the electro-optical module.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings in which.

DETAILED DESCRIPTION

Example embodiments will now be described more fully with reference to the accompanying drawings.

Figure 1:
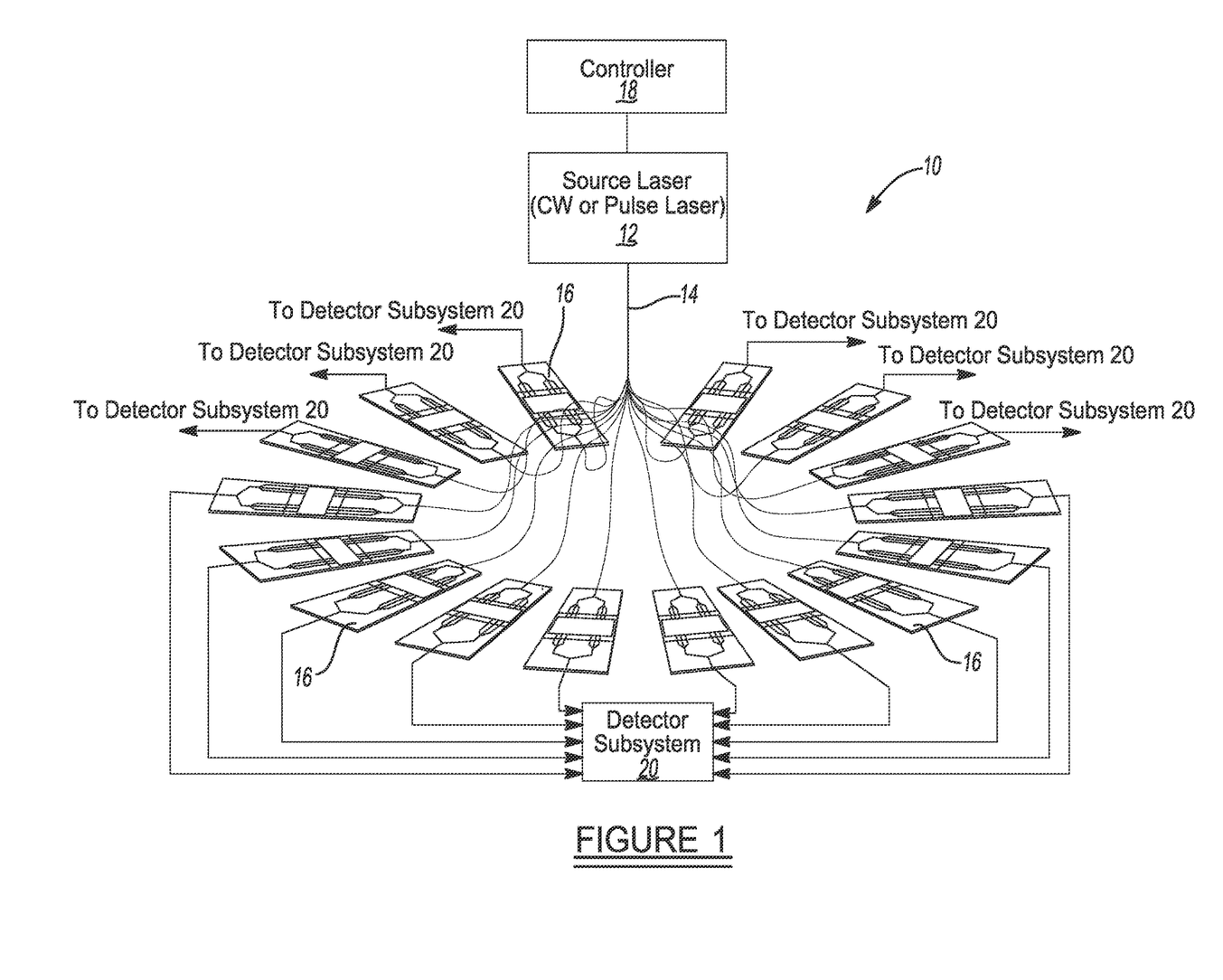
FIG. 1 is a simplified diagrammatic view of one implementation of an all optical modulator system in accordance with one embodiment of the present disclosure.

Referring to FIG. 1 there is shown a simplified high level perspective illustration of one embodiment of an all optical electrode based system 10 in accordance with the present invention. In this example the system 10 includes a laser source 12 which feeds an optical signal via a collection of input fiber optic elements 14 to each one of a plurality of electro-optical modules 16 (hereinafter simply "EO modules" 16). Each EO module 16 communicates with an optical detector subsystem 20. The laser source 12 may be a continuous wave ("CW") laser or a pulse laser, and may include its own controller, or it may be controlled by an external controller 18, such as shown in FIG. 1. The laser source 12, the detector subsystem 20 and the controller 18 may form a single subassembly housed in a common hermetically sealed housing, or they may be housed in separate, preferably hermetically sealed, housings.

The EO modules 16, when implanted in a human anatomy, for example in a human brain, provide optical output signals which are representative of the electrical signals generated within the human anatomy. More specifically, each EO module 16 accomplishes by modulating the optical input signal, which it receives from the source laser 12, using the electrical signals detected from within the human anatomy. These received electrical signals detected from within the human are thus converted by the EO modules 16 into optical pulses, which are then output to the optical detector subsystem 20, which converts the received optical pulses back into electrical signals for recording. The detector subsystem 20 may incorporate suitable electronics and software to enable recording the data represented by the optical pulses, or alternatively a separate recording subsystem may be employed. In either event, the detector subsystem 20 is sufficiently small in size that it can be easily carried on the person of an individual with little to no inconvenience. The detector subsystem 20 is also preferably enclosed in a hermetically sealed housing.

The laser source 12 and controller 18 are likewise constructed sufficiently small so as to be easily carried and/or even implanted in the human body. The EO modules 16 are typically of even smaller dimensions, in one implementation on the order of 10 mm×10 mm or even smaller, and are thus easily implantable in the human anatomy area of interest, which as noted above in one application is the human brain.

Figure 2:
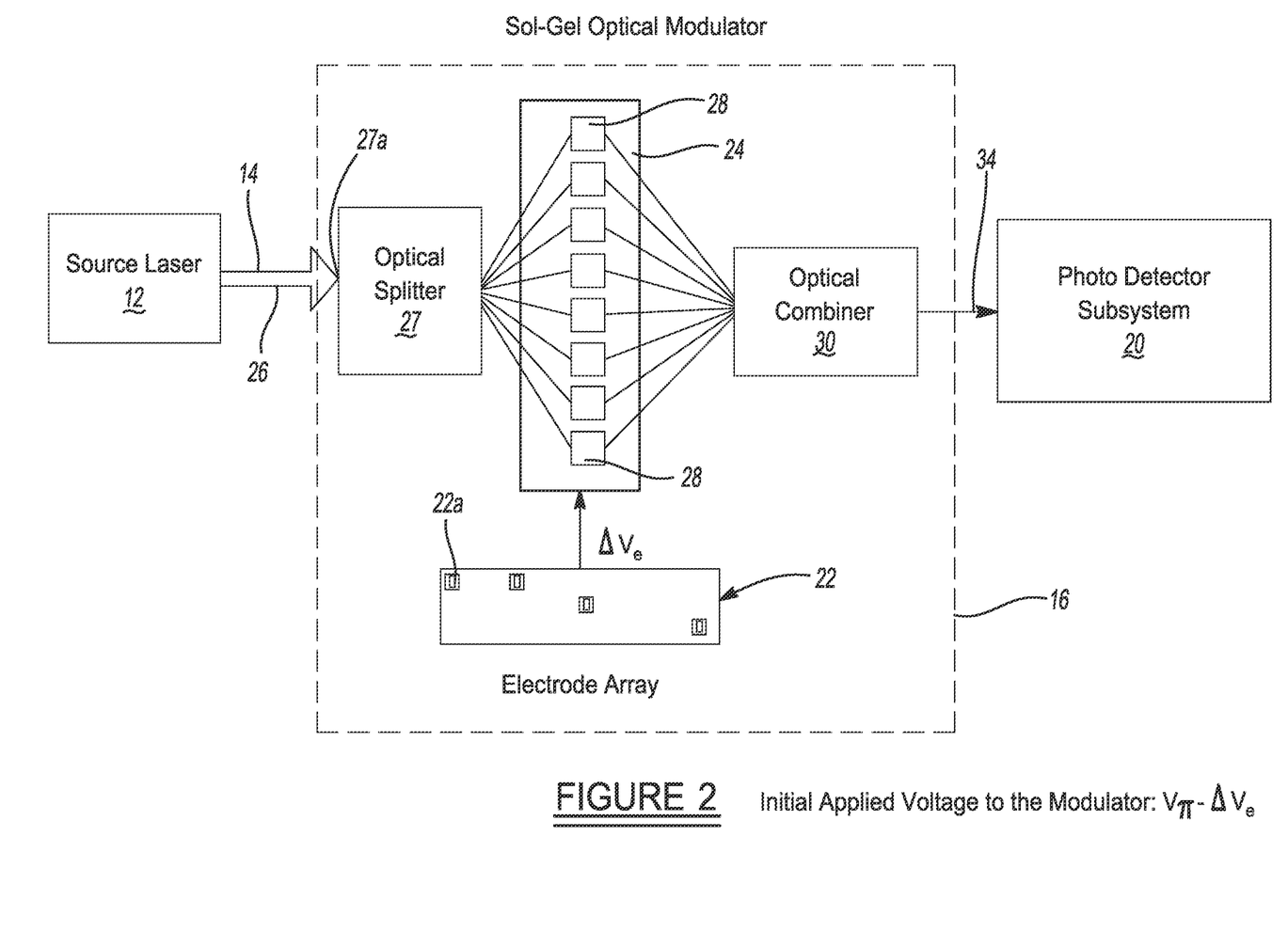
FIG. 2 is a high level block diagram of various components that may be used to construct one embodiment of an electro-optical modulator subsystem of the system of FIG. 1.

FIG. 2 shows the major subsystems of one of the EO modules 16. In this example the EO modules 16 are constructed identically but they need not all be absolutely identical in construction. Certain ones of the EO modules 16 could be constructed with a greater or lesser number of electrodes and outputs, as will become apparent from the following discussion. In one embodiment, each EO module 16 includes an electrode array 22 comprised of a predetermined number of independent electrodes 22a, typically on the order of dozens, hundreds, thousands or more independent electrodes. Only a few such electrodes 22a are shown in representative fashion in FIG. 2 to avoid cluttering the drawing. The electrode array 22 feeds electrical signals from each of the electrodes 22a into an optical modulator subsystem 24, which in this example is a Sol-gel optical modulator subsystem. As is known in the industry, a Sol-gel optical modulator converts an electrical signal into an optical signal, often by using a change in voltage of the received electrical signal to cause a phase change or a change in intensity of the optical signal. Thus, the generated optical output signals from the EO module 16 are representative, typically by either a phase change or a magnitude change, of the electrical signals received by each of the electrodes 22a.

It will be appreciated that a Sol-gel type optical modulator system provides a number of important advantages including easy modification of material properties, good processability, and ease in synthesizing. Sol-gel enhances the performance of the EO modulator 16 by enabling an optical modulator design with low optical loss, increased poling efficiency and careful controlled manipulation of the electric field used for driving the EO modulator 16. Sol-gel also enables the use of different refractive indices and provides for low optical attenuation to minimize fiber coupling and out-of-device loss.

The optical modulator subsystem 24 of FIG. 2 also receives an input optical signal 26 from the source laser 12 over one of the input fiber optic elements 14, and uses an optical waveguide splitting network, in the form of optical splitter 27, which splits the input optical signal 26 received at input 27a into a plurality of optical subcomponents using a network of input optical waveguide elements. The optical subcomponents are then applied simultaneously via the input waveguide elements of the optical splitter 27 to different "pixels" 28 of the optical modulator subsystem 24.

Each pixel 28 operates to modulate (i.e., encode) the received optical subcomponent using the electrical signal received from an associated one of the electrodes 22a. In this regard it will be understood that each pixel 28 includes an associated one of the electrodes 22a, as will be described in greater detail in the following figures. The illustration of the electrodes 22a as one electrode array 22 in FIG. 2 is merely meant to help the reader gain a high level understanding of the various components of the EO modulator 16.

Referring further to FIG. 2, the EO modulator 16 further includes an optical combiner 30 having a plurality of waveguide elements which forms an optical waveguide network to channel the optical output signals from each pixel 28 to an output 32 of the optical combiner 30. The optical combiner 30 effectively operates as a multiplexer to produce a multiplexed optical output signal at its output 32. This multiplexed optical output signal at output 32 is applied via a fiber optic element 34 to the photo detector subsystem 20 where it is converted to a representative electrical signal. Optionally, but preferably, the detected electrical signals from the detector subsystem 20 are recorded in a suitable memory (e.g., RAM or ROM), which may be a separate component or may be part of the detector subsystem 20, as noted above.

Figure 3:
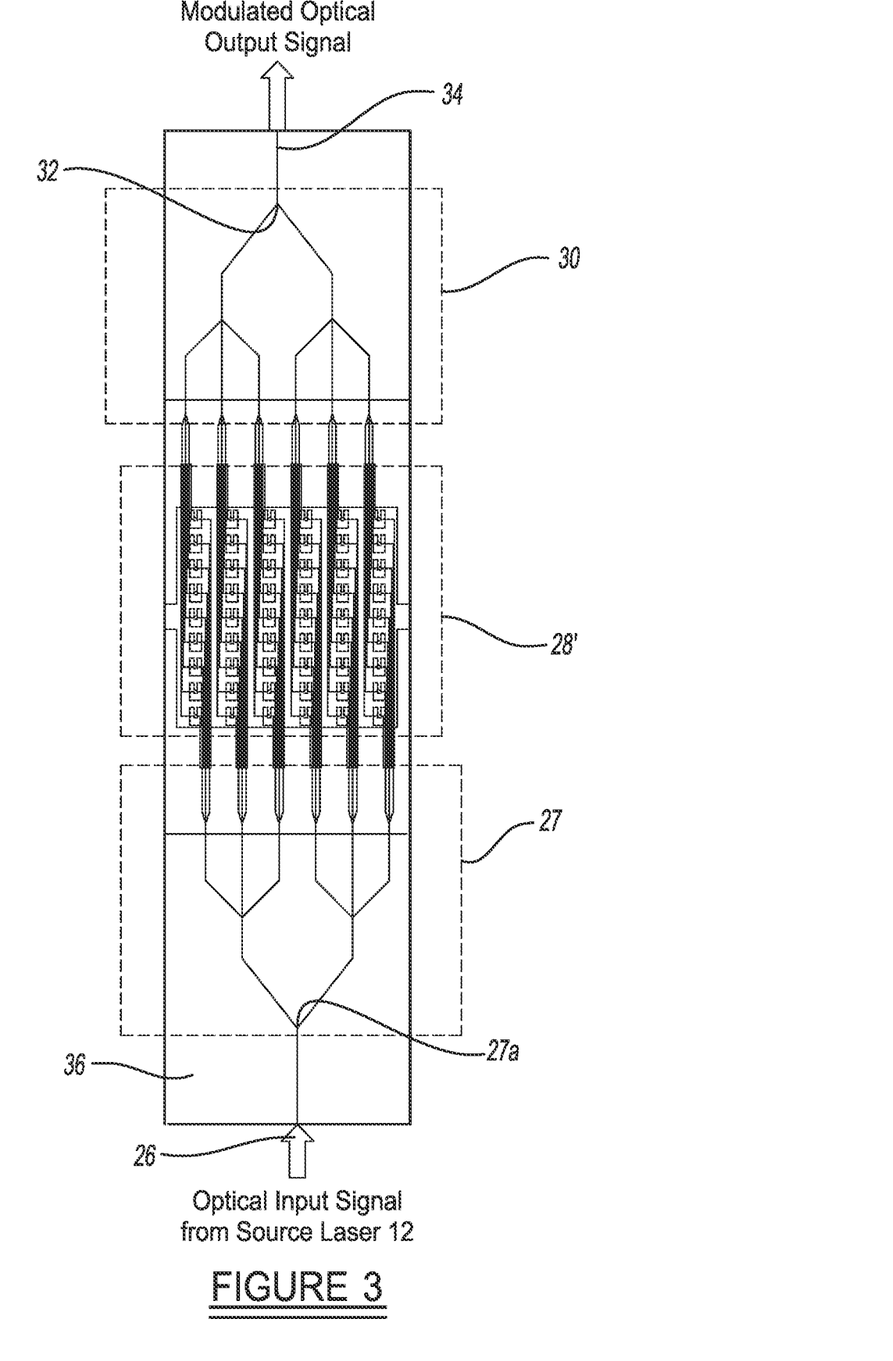
FIG. 3 is a high level circuit diagram of the electro-optical modulator shown in FIG. 2.

FIG. 3 shows a circuit-like diagram of the EO modulator 16. The EO modulator 16 may be formed on a thin film, insulative polymer substrate material 36, and as such is flexible and able to be configured in different shapes. In one configuration the EO modulator 16 may be rolled into a small cylinder and implanted in the brain or other area of a human anatomy to act as a cylindrical probe with a large plurality of the independent electrodes 22a in contact with the tissue of the human anatomy. Portions of the EO modulator 16 may be hermetically sealed, such as subsystems 24, 27 and 30, although the electrodes 22a need to be able to receive the electrical signals from the tissue in which the EO modulator 16 is implanted. Advantageously, all of the optical splitter 27, the optical modulator subsystem 24 with its pixels 28, and the optical combiner 30 are supported on the substrate material 36, and form a highly condensed subassembly which can be easily handled and manipulated as a single component when being implanted by a surgeon. The drawback of needing to carefully manipulate dozens, hundreds or more delicate, independent wires with a conventional implantable probe is therefore eliminated with the EO modulator 16.

Figure 4:
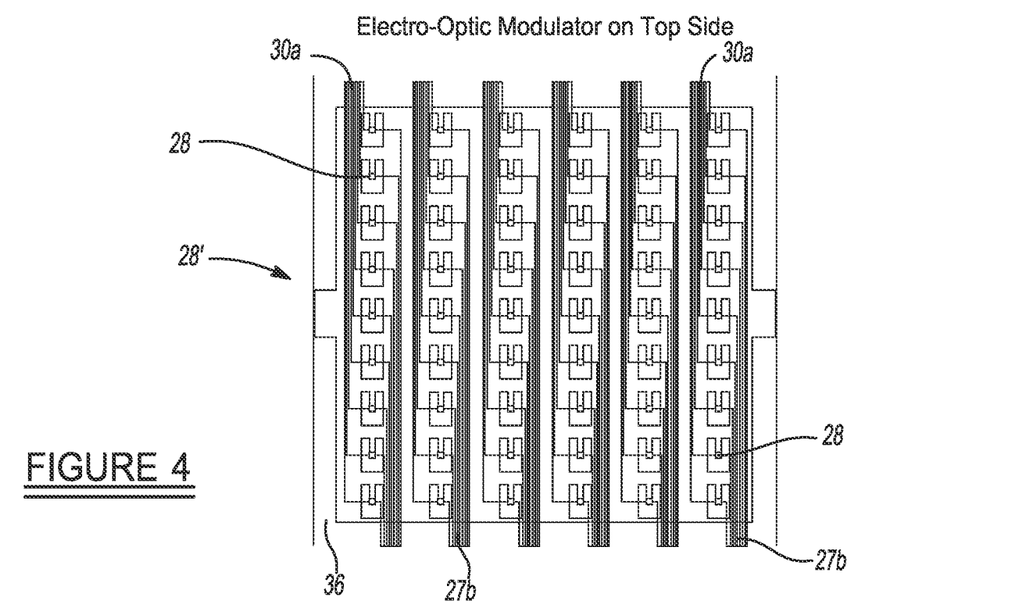
FIG. 4 is a plan view of just a portion of a top side of the electro-optical modulator of FIG. 3.

FIG. 4 shows a top side schematic illustration of the EO modulator 16. The pixels 28 can be seen as being arranged in an X-Y grid, collectively labelled 28'. It will be appreciated, however, that while an X-Y grid makes especially efficient use of available space, other arrangements or configurations of pixels could be used as well. For example, the pixels 28 could be arranged in concentric circles, concentric ellipses or virtually another other pattern. The selected configuration of the pixels 28 may depend in part on the final shape that the EO module 16 takes. Sections 27b of the optical splitter 27 represent collections of independent waveguide elements 27b1 of the optical splitter that feed optical subcomponents of the optical signal 26 supplied by the source laser 12 to each of the pixels 28. Sections 30a represent collections or groups of independent optical waveguide elements 30a1 that form the optical combiner 30 that collect modulated optical signals from the pixels 28 and carry same to the detector subsystem 20. Each pixel 28 has an associated electrode 22a (not visible in FIG. 4) that receives electrical signals from the tissue in which the EO modulator 16 is implanted.

Figure 5:
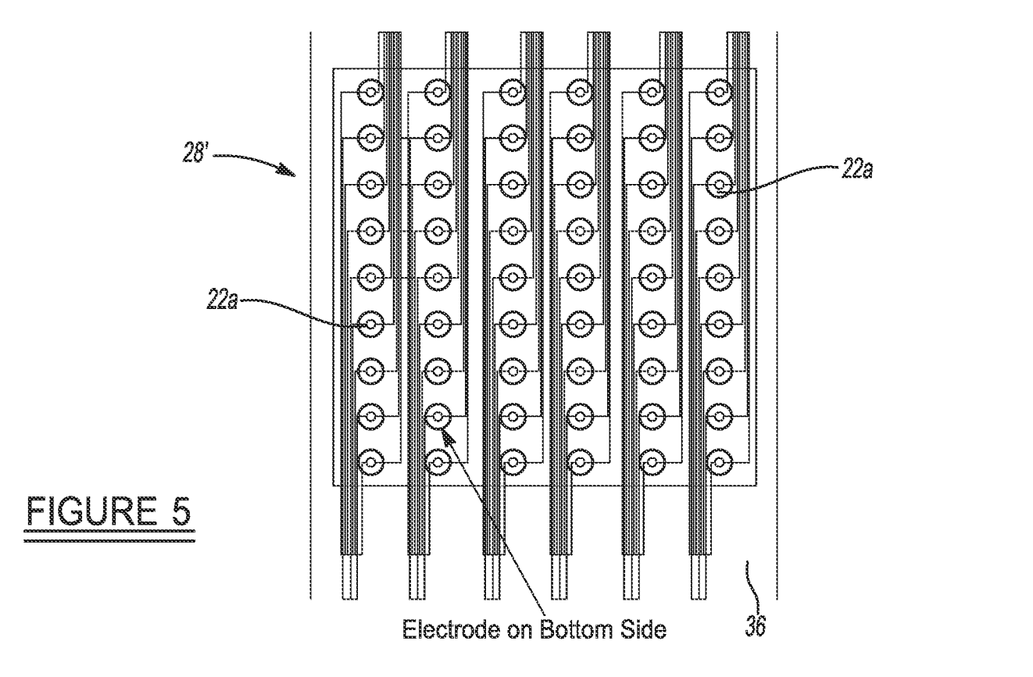
FIG. 5 is a plan view of just a portion of a bottom side of the electro-optical modulator of FIG. 3.

FIG. 5 shows the EO module 16 from a bottom side. The electrodes 22a are visible in this example and form an X-Y grid pattern. The electrodes in the example are 20 μms in diameter and made of Platinum and iridium.

Figure 6:
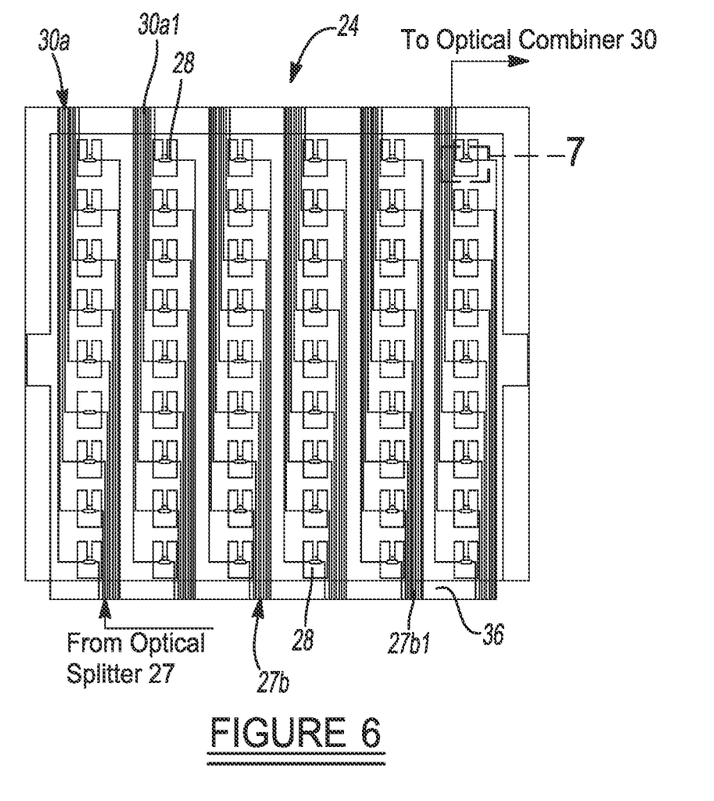
FIG. 6 is a more detailed, enlarged view of just a central portion of the electro-optical modulator of FIG. 3.
Figure 7:
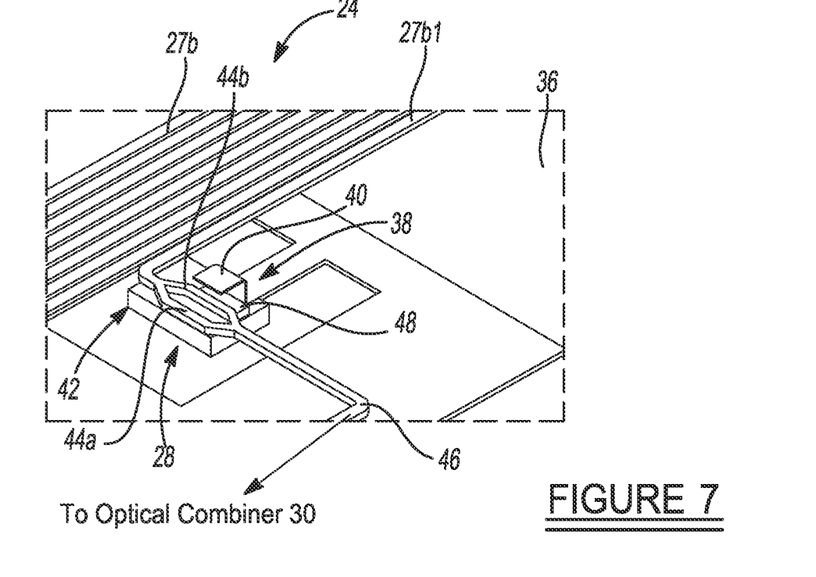
FIG. 7 is a highly enlarged, perspective view of the components associated with one "pixel" of the electro-optical modulator of FIG. 6.

Referring to FIGS. 6 and 7, the optical modulator subsystem 24 can be seen in greater detail. In FIG. 7, the construction of one pixel 28 can be seen in greater detail. Each pixel 28 includes a metallic ground plane 38 supported on the substrate 36.

The ground plane 38 has an angled portion 40 disposed closely adjacent to a section or block of Sol-gel cladding 42. The Sol-gel cladding block 42 is formed on or attached to the substrate 36. The Sol-gel cladding block 42 encases a section of one of the waveguide elements of waveguide elements group 27b, where the section branches into two parallel waveguide branches 44a and 44b before re-combining into a single Sol-gel output waveguide element 46. An electro-optic polymer section 48 is also encased in the Sol-gel cladding block 42 and positioned over one of the parallel waveguide branches 44a or 44b, in this example the waveguide branch 44b. The electro-optic polymer section 48 resides over one of the electrodes 22a, which is on the opposite surface of the substrate 36 and thus not visible in FIG. 7. The single Sol-gel output waveguide element 46 forms one input to the optical combiner 30.

In operation, the pixel 28 described above receives the voltage sensed by its associated electrode 22a. The initial voltage applied to the optical modulator subsystem 24 may be represented by $V_\pi - V_e$, where $V_\pi$ represents voltage needed to induce 180 degree phase shift in the wavelength passing through the modulator arm and $V_e$ represents the voltage picked up by the electrode. This voltage causes the electro-optic polymer 48 to act on the optical signal being fed through the waveguide branches 44a and 44b, and to modify at least one of the phase or magnitude of the optical signal passing through the waveguide branch 44b. Accordingly, the resulting combined optical signal passing into the waveguide element 46 from waveguide branches 44a and 44b will change in some respect, either in phase or in magnitude, in accordance with the electrical signals received by the electrode 22a. This changing optical signal will be transmitted over the Sol-gel waveguide element 46 into the optical combiner 30 and eventually transmitted to the optical detector subsystem 20. Thus, every single pixel 28 of the EO modulator 16 will be creating a changing optical signal (i.e., changing in some respect such as phase, pulse length, magnitude, etc.) in response to received electrical signals from the tissue in which the EO modulator 16 is implanted. These received electrical signals are output to the optical combiner 30.

In FIG. 7, it will be appreciated that the metallic ground plane 38 provides a reference for the electrical neural signal, $V_e$, picked up by the electrode 22a of the pixel 28. When $V_e$ is applied to one end of the modulator arm and the other end is kept at a zero or reference potential by use of the metallic ground plane 38, EO polymers will modulate light passing through the modulator (i.e., in this example through the waveguide branch 44b). The larger the difference in voltage, the larger will be the phase change at the output of the pixel 28. Since the system 10 will be implanted inside a relatively noisy environment (i.e., in human brain tissue), having a ground/reference terminal ensures that a known voltage difference is applied across the electro-optic polymer section 48, which here is forming the modulator "arm". Optionally, the ground/reference plane can be formed by a remote electrode at the back of the brain (i.e., far away from the areas where the EO modules 16 are implanted).

Figure 8:
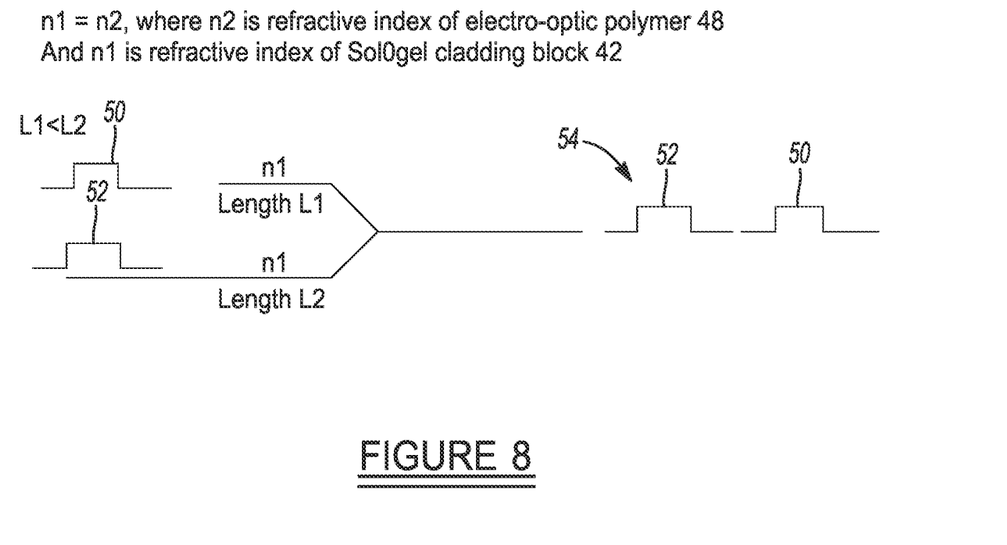
FIG. 8 is a timing diagram illustrating how time multiplexing of the optical output signal can be achieved by using the electro-optical modulator to create time differentiated, sequential, optical pulses having different pulse lengths, while using a common refractive index for various material portions of the electro-optical modulator.
Figure 9:
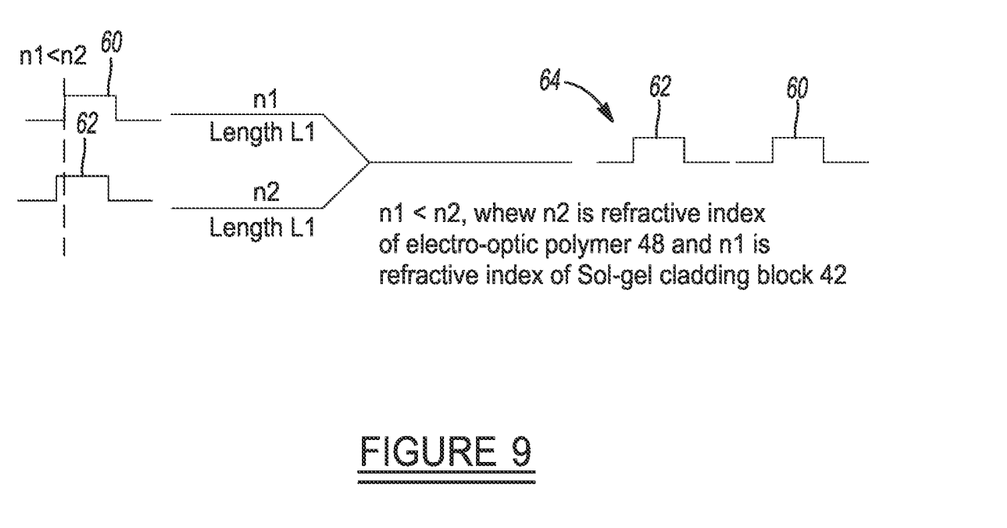
FIG. 9 is a timing diagram illustrating how time multiplexing of the optical output signal can be achieved by using optical materials in the electro-optical modulator which have different refractive indices, which produces an optical pulse train with sequential pulses that differ in phase from one another, but where the pulse length of each of the pulses is the same.

Referring briefly to FIGS. 8 and 9, different techniques are disclosed for differentiating the optical pulses being output from each pixel 28. FIG. 8 shows two pulses 50 and 52, where the length of pulse 50 has been modified by the electro-optic polymer 48 of the pixel 28 in response to an electrical signal (i.e., pulse) having been received from the associated electrode 22a of the pixel. This produces a pulse train 54 with pulses of differing lengths which can be used by the optical detector subsystem 30 to recognize the presence of the electrical signals in the human anatomy being monitored.

FIG. 9 shows an alternative technique in which the pulse lengths of the pulses produced by the EO modulator 16 are the same, but instead the refractive index of the electro-optic polymer 48 differs from the refractive index of the Sol-gel cladding block 42. This enables the electro-optic polymer 48 to influence a phase of the optical signals passing through waveguide branch 44b in response to the voltage sensed by the electrode 22a of its pixel 28. As a consequence, the resulting pulses produced when an electrical signal is generated by the electrode 22a causes a change in the phase of the pulse, as shown by pulse 62, when compared to a pulse, shown by pulse 60, which is produced when no electrical signal is influencing the optical signal passing through the electro-optic polymer 48. This phase difference in the train of pulses 64 in FIG. 9 is detectable by the optical detection subsystem 30.

The system 10 thus provides a means for implementing a large number of electrodes in a densely configured, integrated probe. It is a principal advantage of the system 10 that the system converts the received electrical signals from the electrodes 22a to optical signals in a highly space efficient, integrated, package. The system 10, and particularly the EO modulator 16, eliminates the need for hundreds, thousands or more of small, delicate electrical conductors, which would normally be required, and which would normally make handling and implantation of a strictly electrical probe component challenging or even impossible.

While the system 10 has been discussed in connection with a bioengineering application involving the implantation in human anatomy, it is expected that the ability of the system to package a large plurality of electrodes, to create an all optical output signal from the signals received by the electrodes, is likely to find utility in a wide variety of other fields and implementations. Virtually any application or implementation where a high number of electrical signals need to be monitored, and where space is limited and/or the presence of hundreds, thousands or more of small wires is problematic, may represent a potential application of the system 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An electro-optical modulator system, comprising:
   an optical source for generating an input optical signal;
   an electro-optical module implantable into an anatomy, the electro-optical module including a substrate for supporting a plurality of pixels and a plurality of electrodes thereon, each said pixel having associated therewith:
      an electrode electrically coupled with the pixel for receiving electrical signals in the form of voltages detected by the electrode from the anatomy;
      an optical modulator subsystem including an electro-optic polymer section disposed in proximity to the electrode, the optical modulator subsystem configured to receive the input optical signal, wherein the electro-optic polymer section modulates the input optical signal in relation to the received electrical signals from the electrode, and generates modulated optical output signals in relation to the received electrical signals; and
   a detector subsystem for detecting the modulated optical output signals.

2. The system of claim 1, wherein the electro-optical module includes:
   an optical splitter for receiving the input optical signal and splitting the input optical signal into a plurality of optical subcomponents; and
   a plurality of waveguide elements for receiving and channeling the optical subcomponents.

3. The system of claim 2, wherein each said optical modulator subsystem is configured to receive one of the optical subcomponents, and wherein each said optical modulator subsystem includes:
   an associated one of the electrodes for receiving the electrical signals from the anatomy;
   an associated one of the electro-optic polymer sections disposed in proximity to the electrode and configured to receive the one of the optical subcomponents and to use the received electrical signals supplied by the electrode to modulate the one of the optical subcomponents to produce the modulated optical output signals in accordance with the received electrical signals.

4. The system of claim 3, further comprising an optical combiner for receiving the modulated optical output signals from the pixels.

5. The system of claim 4, wherein each one of the plurality of waveguide elements branches into two waveguide branches at entering its respective said pixel, and then merges back into a single sol-gel waveguide element after exiting its respective said pixel.

6. The system of claim 5, wherein the single sol-gel waveguide element forms one input to the optical combiner.

7. The system of claim 6, wherein the electro-optic polymer is aligned with, and disposed in proximity to, only one of the two waveguide branches, to thus modulate light passing through only one of the two waveguide branches.

8. The system of claim 7, wherein the optical signal entering the optical modulator subsystem comprises a pulsed optical signal, and wherein the electro-optic polymer is configured to modify at least one of a phase or a pulse length of optical pulses which form the modulated optical output signals.

9. The system of claim 7, wherein both of the two waveguide branches are at least partially encased in a sol-gel core.

10. The system of claim 8, wherein the electro-optical modulator includes an optical combiner for collecting the modulated optical output signals from each said pixel and channeling the modulated optical output signals from each said pixel into a single optical fiber.

11. The system of claim 4, further comprising a substrate for supporting the optical splitter and the optical combiner.

12. The system of claim 1, wherein the optical source comprises a laser.

13. The system of claim 1, wherein the electro-optical module includes:
   an optical splitter for splitting the input optical signal into a plurality of optical subcomponents, each one of the optical subcomponents being fed to an associated one of the pixels; and
   a separate optical modulator subsystem associated with each said pixel, and including an electro-optic polymer component responsive to electrical signals from an associated one of the electrodes, for modulating an associated one of the optical subcomponents to create the modulated optical output signals; and
   an optical combiner for combining the modulated optical output signals received from each of the pixels into a single output waveguide element; and
   wherein the optical splitter, the optical modulator subsystems and the optical combiner and all formed on a thin film, flexible substrate.

14. An electro-optical modulator system, comprising:
   a laser for generating an input optical signal;
   an input optical fiber for receiving the input optical signal;
   an electro-optical module in communication with the input optical fiber and implantable into an anatomy, the electro-optical module including:
      a substrate having first and second sides;
      the first side of the substrate including a ground plane and a plurality of pixels, and the second side of the substrate including a plurality of electrodes;
      an optical splitter supported on the substrate for splitting the input optical signal into a plurality of input optical signal components;
      each said pixel having associated therewith:
         an associated one of the electrodes for detecting electrical signals originating from an anatomy;
         an optical modulator subsystem supported on the first side of the substrate and disposed in proximity to the electrode, for receiving one of the optical input signal components as a second input signal to the pixel, and modulating the received one of the input optical signal components in relation to the received electrical signals provided by the electrode, and generating modulated optical output signals in relation to the received electrical signals; and
      the electro-optical modulator further including an optical combiner forming a network of output waveguide elements and being supported on the substrate, and configured to receive the modulated optical output signals from each one of the pixels, and combine the received, modulated optical output signals into a single output waveguide element.

15. The system of claim 14, further comprising a detector subsystem for receiving the modulated optical output signals from the single output waveguide element.

16. The system of claim 14, wherein the optical modulator subsystem includes:
   first and second waveguide branches which split the received one of the input optical signal components from the optical splitter into first and second optical components in parallel optical paths; and an electro-optic polymer section disposed in proximity to the first waveguide branch, for modifying a property of the first optical component passing through the first waveguide branch, and wherein the second optical component passing through the second waveguide branch remains unmodified.

17. The system of claim 16, wherein the electro-optic polymer section is configured to modify at least one of a phase or a pulse length of the first optical component.

18. The system of claim 16, further comprising a Sol-gel component for at least partially enclosing the first and second waveguide branches and the electro-optic polymer section.

19. A method for monitoring electrical signals originating within an anatomy, the method including:
   using an optical source to supply an input optical signal over an input fiber optic element;
   using an electro-optical module implanted within the anatomy, and in communication with the input fiber optic element, to receive the input optical signal;
   further using the electro-optical module to receive electrical voltage signals generated from within the anatomy;
   further using the electro-optical module to modulate the input optical signal using the received electrical voltage signals, to thus generate modulated optical output signals;
   further comprising using the electro-optical module to combine and supply the modulated optical output signals into a single output fiber optic element; and
   using a detector subsystem to receive the modulated optical output signals from the electro-optical module.

20. The method of claim 19, wherein using the electro-optical modulator to convert the received electrical voltage signals into modulated optical output signals comprises using the electro-optical modulator to modify at least one of a phase or a pulse length of the input optical signal, in response to the received electrical signals.

* * * * *